United States Patent
Keller et al.

(10) Patent No.: US 6,866,270 B2
(45) Date of Patent: Mar. 15, 2005

(54) SEALING DEVICE FOR CYLINDER BEARINGS

(75) Inventors: Karl Keller, Hilchenbach (DE); Konrad Roeingh, Hilchenbach (DE)

(73) Assignee: SMS Demag Aktiengesellschaft, Dusseldorf (DE)

(*) Notice: Subject to any disclaimer, the term of this patent is extended or adjusted under 35 U.S.C. 154(b) by 0 days.

(21) Appl. No.: 10/471,656

(22) PCT Filed: Jan. 30, 2002

(86) PCT No.: PCT/EP02/00915

§ 371 (c)(1),
(2), (4) Date: Sep. 10, 2003

(87) PCT Pub. No.: WO02/074461

PCT Pub. Date: Sep. 26, 2002

(65) Prior Publication Data

US 2004/0100029 A1 May 27, 2004

(30) Foreign Application Priority Data

Mar. 20, 2001 (DE) ........................................ 101 13 593

(51) Int. Cl.[7] .............................. B21B 27/06; F16J 15/44
(52) U.S. Cl. ........................ 277/349; 277/411; 277/412; 277/552; 277/903; 72/236
(58) Field of Search ................................. 277/347–349, 277/411–412, 549–551, 903; 72/236–237, 247

(56) References Cited

U.S. PATENT DOCUMENTS 3,832,021 A * 8/1974 Jennings et al. ............ 277/321
3,833,273 A * 9/1974 Rickley et al. ............. 277/419
4,435,096 A * 3/1984 Petros ........................ 384/147
4,455,846 A * 6/1984 Wichinsky .................... 70/94
4,679,801 A   7/1987 Poloni
5,478,090 A * 12/1995 Simmons et al. ........... 277/423

FOREIGN PATENT DOCUMENTS

GB    1 308 098     2/1973
JP     11267721    10/1999

* cited by examiner

*Primary Examiner*—Alison Pickard
*Assistant Examiner*—Vishal Patel
(74) *Attorney, Agent, or Firm*—Herbert Dubno Andrew Wilford

(57) ABSTRACT

A C-section ring fixed on a steel-mill roll and coaxially surrounding its stub has inner and outer axially extending legs defining an axially open cavity. The inner leg is tapered away from the roll and is formed adjacent the free end with a radially outwardly open annular groove. An annular cover part fixed on a stationary support, engaged in the cavity, forming a drain compartment open axially away from the roll, and formed with a radially outwardly open catchment groove radially aligned with a free end of the inner leg is also formed with a passage extending from the catchment groove to the drain compartment. An annular extension on the cover part has an inner surface carrying a seal ring that bears radially inward on the stub. An add-on part on the extension forms with the extension, with the cover part, and with the C-section ring a labyrinth.

8 Claims, 2 Drawing Sheets

SEALING DEVICE FOR CYLINDER BEARINGS

CROSS REFERENCE TO RELATED APPLICATIONS

This is the US national phase of PCT application PCT/EP02/00915 filed 30 Jan. 2002, published 26 Sep. 2002 as WO 02/74461, and claiming the priority of German application 101 13 593.9 filed 2 Mar. 2001.

FIELD OF THE INVENTION

The invention relates to a seal assembly for a roll bearing wherein an annular element fixed rotationally to the roll stub forms an annular seal face for an elastic stationary seal element, a labyrinth seal formed of stationary parts and parts on the roll being provided between the seal element and the roll body.

BACKGROUND OF THE INVENTION

Such seal assemblies have long been used in oil-film bearings. As a rule expensive seals are used which on the one hand prevent oil from getting from the oil-film bearing to the roll body and on the other hand prevent particle-carrying coolant and lubricant from getting from the roll body into the oil-film bearing.

In addition to bearing provided with stationary seals bearings are known where the seals are connected to the roll stub, that is the seal elements rotate and engage stationary seal surfaces. Even here expensive seal rings are used in order to provide the necessary sealing between the roll and the bearing.

OBJECT OF THE INVENTION

It is an object of the invention to provide a seal assembly of this type that, in spite of simple and inexpensive seal elements, seals effectively and where the service life of the seal assembly relative to the known seal assemblies is larger so that the seal assembly works out to be more cost effective.

SUMMARY OF THE INVENTION

In order to achieve this object, the invention purposes that the labyrinth be formed by a C-section ring sealingly fixed on an end of the roll and forming a C-shaped cavity receiving a stationary annular cover part, that the annular cover part forms an outwardly open external drain compartment, that the labyrinth gap be remote from a floor of the drain compartment, and that the annular cover part have an extension whose outer side forms part of the labyrinth path and whose inside carries the stationary seals.

The labyrinth seal thus seals the roll-side of the bearing while the seal elements only seal the bearing side. Thus expensive seal elements that are normally used in both locations, are not necessary.

Most of the coolant and lubricant running off the roll surface arrives at one side of a wedge-shaped diverter. Rotation of the wedge-shaped diverter drives the coolant and lubricant to its edge where the centrifugal force is at its greatest. Most of the coolant and lubricant is spun off here. The remaining coolant and lubricant moves against the centrifugal force toward the bearing. The centrifugal force is however effective such that the coolant and lubricant on the outside of the diverter is moved to the sharp edge of the diverter. The greatest portion of the coolant and lubricant not spun off the diverter gets into the drain compartment and is fed thence to a receptacle.

Even so, lubricant and coolant can get into the labyrinth seal. As soon as drops contact the rotating parts of the labyrinth seal, they are moved outward by centrifugal force. Only those drops that collect on the stationary part of the labyrinth seal drip in a first region of the labyrinth seal onto the leg of the C-section ring whence the coolant and lubricant are moved outward by centrifugal force.

Any remaining lubricant and coolant in the labyrinth on the inner face of the inner leg of the C-section ring is trapped by a groove and thence moved to the catchment groove(s). The catchment grooves collect the droplets which flow to the lowest part of the catchment groove where the coolant and lubricants flow out through the outlet passage from the labyrinth to the drain compartment.

The labyrinth forms with the extension an additional bend. Here the rotating elements of the labyrinth are shaped such that the coolant and lubricant are driven by centrifugal force into the outlet passages.

At the end of the labyrinth path the extension has an add-on piece that greatly restricts the labyrinth path so that at this end the last bits of coolant and lubricant are trapped and moved off to the drain compartment.

It has proven advantageous to use as seal element a radial gland seal ring whose seal lip has at least one annular spring pressing the seal lip against the seal face. Such glands are standard seals in machines and are not expensive or difficult to manufacture. The advantage is that when two identical seal rings are provided together it is possible to surely prevent oil from getting from the bearing region into the labyrinth region.

It is preferable when an input/output passage is provided between the two glands to lubricate the second seal lip and to carry off excess oil.

BRIEF DESCRIPTION OF THE DRAWING

The invention is described more closely with reference to a drawing. Therein.

SPECIFIC DESCRIPTION

Figure 1:
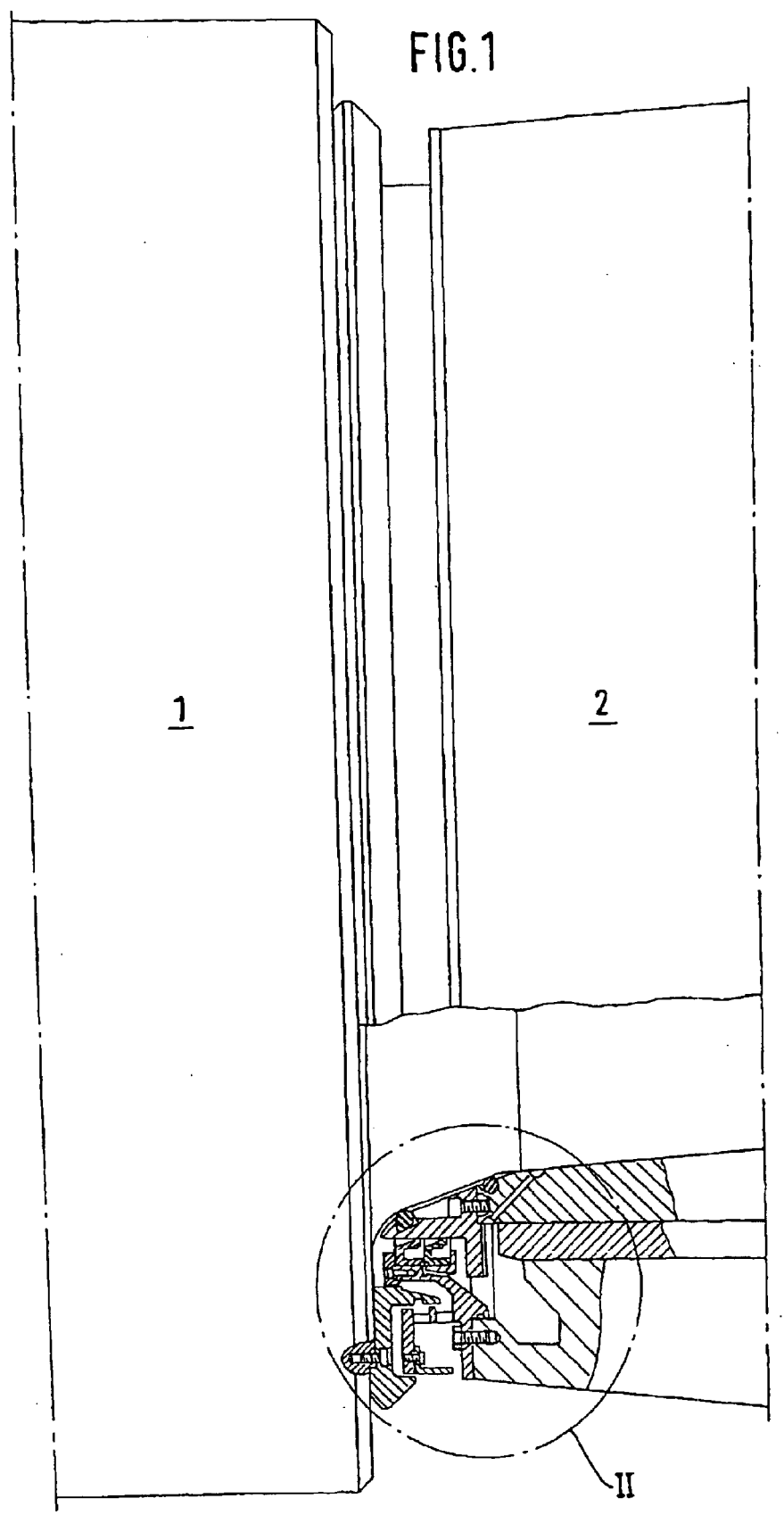
FIG. 1 is a view of a roll with an oil-film bearing.

FIG. 1 shows a roll 1 having a roll stub 2. The roll stub 2 is fitted with a bearing sleeve 3 on which is mounted an extension 4. In addition a part of a stationary support 5 as well as another bearing sleeve 6 are shown. A C-section ring 7 is fixed by screws 8 on the end of the roll 1. The C-shaped cavity of the C-section ring 7 receives an annular seal part 9 that is fixed on the support 5. The annular seal part 8 forms an annular outwardly open drain compartment 30. The annular seal part 9 is juxtaposed with an extension 10 on the support 5.

Figure 2:
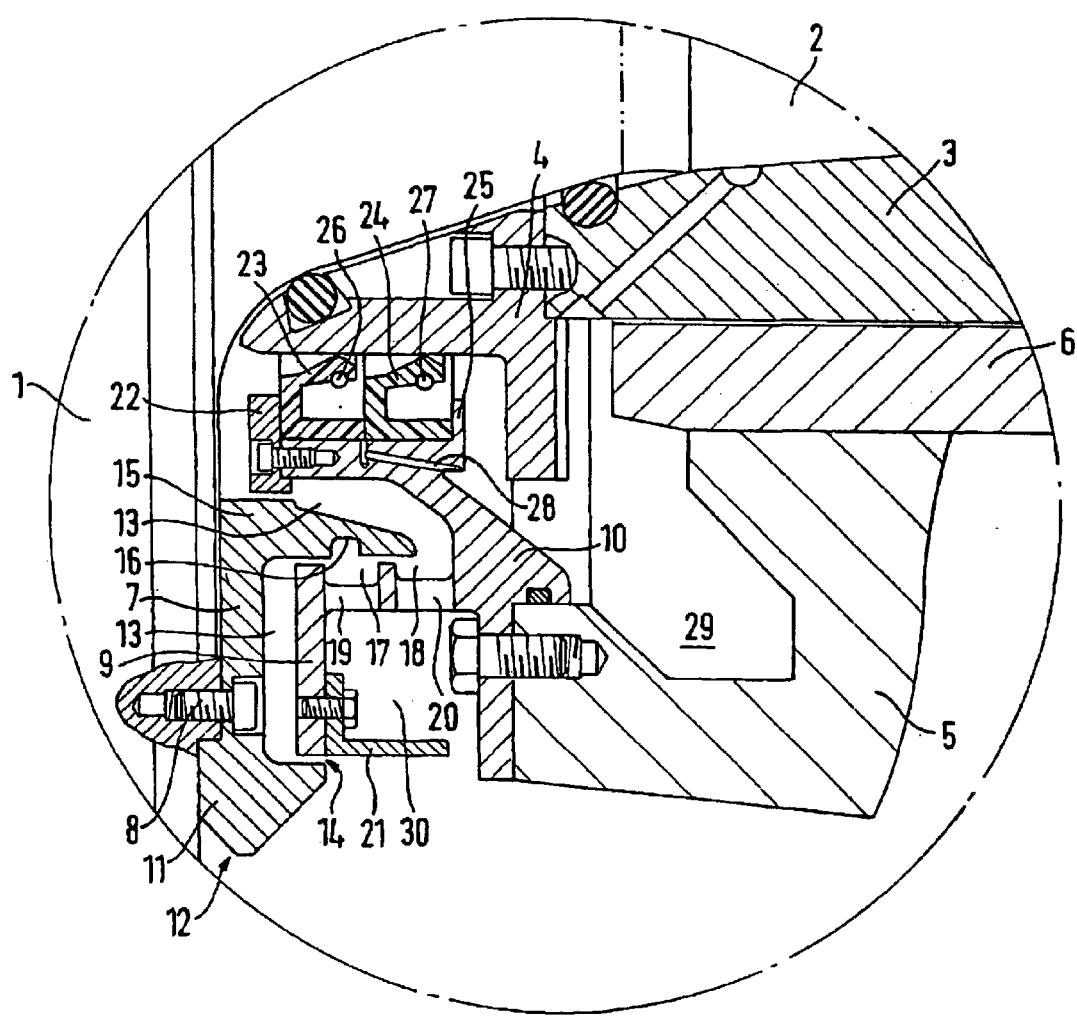
FIG. 2 is a detail of the seal.

FIG. 2 shows how an outer leg 11 of the C-section ring 7 forms an outer wedge-shaped diverter 12. The wedge-shaped diverter 12 ensures that coolant and lubricant flowing from the roll 1 collects at its sharp edge where the centrifugal force is greatest and is thrown off from this edge. In addition the coolant and lubricant collect generally in the drain compartment 30 and flow out from it so it cannot get into a labyrinth 13.

Small amounts of coolant and lubricant can nonetheless get through a gap 14 into the labyrinth 13. If these droplets come into contact with the rotating C-section ring 7, they will be taken up and transported by centrifugal force to the outer leg 11 and thence the droplets leave the labyrinth 13 through the gap 14.

If droplets in the labyrinth 13 land on the annular seal part 9, they will move outward on this part and, depending on their location, will either end up on the outer leg 11 or an inner leg 15 of the C-section ring 7. Thence the droplets are driven by centrifugal force through the gap 14.

Remnants of coolant and lubricant that go deeper into the labyrinth 13 are caught by the inner leg 15 which has a groove 16. The droplets collect on the flanks of the groove or in the groove and are centrifugally driven into catchment grooves 17 and 18. The catchment grooves 17 and 18 are formed in the annular seal part 9. The lower part of FIG. 2 shows outlet passages 19 and 20 formed in the catchment grooves 17 and 18 and from which the coolant and lubricant collecting in the grooves 17 and 18 can leave the labyrinth 13 via the drain compartment 30.

In order that no coolant or lubricant can get into the passages 19 and 20 from outside, a spray shield 21 is provided in the annular seal part 29 at the passages 19 and 20 and extends in the drain compartment 30 over the passages 19 and 20.

Should coolant and lubricant remnants stay on the end of the inner leg 15 of the C-section ring 7, they will be deflected by the extension 10. The droplets sticking to the extension 10 flow on an inner surface of the extension 10 into the catchment groove 18. Further coolant and lubricant drops can sit on the outer region of the inner leg 15 where the taper of the inner leg 15 and centrifugal forces move then once again to the outer end of the inner leg 15 and from there into the catchment groove 18.

An annular add-on piece 22 is screwed to the outer end of the extension 10, substantially restricts the labyrinth 13, and also serves to press seal elements 23 and 24 against an abutment 25 and thus secure seal rings on the extension 10. The seal rings 23 and 24 are C-section glands that are prestressed by respective springs 26 and 27 against the bearing extension 4. The extension 10 is formed with an inlet/outlet passage 28 that opens between the seals 23 and 24 so as to feed oil to lubricate the seal lips of the seal 23 or carry off excess oil from the seal region into an oil sump 29.

What is claimed is:

1. In combination with a roll having a stub centered on and rotatable about an axis and a stationary support adjacent the stub, an assembly comprising:

a C-section ring fixed on the roll, coaxially surrounding the stub, and having inner and outer axially extending legs defining an axially open cavity, the inner leg being tapered away from the roll, having a free end, and being formed adjacent the free end with a radially outwardly open annular groove;

an annular cover part fixed on the support, engaged in the cavity, forming a drain compartment open axially away from the roll, formed with a radially outwardly open catchment groove radially aligned with the free end of the inner leg, and formed with a passage extending from the catchment groove to the drain compartment;

an annular extension on the cover part having an outer surface and an inner surface;

a seal ring fixed on the extension inner surface and bearing radially inward on the stub; and an add-on part on the extension forming with the extension outer surface, with the cover part, and with the C-section ring a labyrinth.

2. The assembly defined in claim 1 wherein the outer leg of the C-section ring has an outwardly pointing wedge-shaped diverter.

3. The assembly defined in claim 1 wherein the cover part has two such catchment grooves and two such passages respective leading from the catchment grooves to the drain compartment.

4. The assembly defined in claim 1, further comprising a spray shield on the cover part defining the drain compartment and spaced from the passage.

5. The assembly defined in claim 1, wherein the extension has on its inner surface spaced axially outward from the add-on part an abutment, the seal ring being axially between the add-on part and the abutment.

6. The assembly defined in claim 1 wherein the seal ring is at least one C-section gland having an inner lip bearing on the seal surface.

7. The assembly defined in claim 1 wherein the seal ring is formed by at least two axially adjacent C-section glands having inner lips bearing on the seal surface.

8. The assembly defined in claim 7 wherein the extension is formed with an input/output passage opening between the glands and with means for feeding a lubricant through the input/output passage to the glands.

* * * * *